United States Patent
Sielhorst et al.

(10) Patent No.: US 12,524,259 B2
(45) Date of Patent: Jan. 13, 2026

(54) CONFIGURATION OF AN SIL SIMULATION OF A CONTROL UNIT RUNNING ON A COMPUTER

(71) Applicant: dSPACE GmbH, Paderborn (DE)

(72) Inventors: Tobias Sielhorst, Paderborn (DE); Artur Wolf, Paderborn (DE)

(73) Assignee: dSPACE GMBH, Paderborn (DE)

( * ) Notice: Subject to any disclaimer, the term of this patent is extended or adjusted under 35 U.S.C. 154(b) by 495 days.

(21) Appl. No.: 18/083,924

(22) Filed: Dec. 19, 2022

(65) Prior Publication Data

US 2023/0195500 A1    Jun. 22, 2023

(30) Foreign Application Priority Data

Dec. 20, 2021   (EP) ..................................... 21215811

(51) Int. Cl.
*G06F 9/455* (2018.01)
*G06F 9/52* (2006.01)

(52) U.S. Cl.
CPC ............ *G06F 9/45558* (2013.01); *G06F 9/52* (2013.01); *G06F 2009/4557* (2013.01)

(58) Field of Classification Search
CPC ................... G06F 9/45558; G06F 9/52; G06F 2009/4557; G06F 2209/5012; G06F 2209/5017; G06F 9/5038; G06F 9/5077; G06F 2209/483; G06F 9/4887
See application file for complete search history.

(56) References Cited

U.S. PATENT DOCUMENTS

| | | | |
|---|---|---|---|
| 9,727,440 B2 | 8/2017 | Suit | |
| 2013/0346647 A1* | 12/2013 | Carrick | G06F 8/34 710/52 |
| 2016/0085572 A1* | 3/2016 | Hotra | G06F 9/4887 718/1 |
| 2020/0244558 A1* | 7/2020 | Palander | H04L 43/0852 |
| 2022/0188386 A1* | 6/2022 | Jain | H04L 9/0841 |

OTHER PUBLICATIONS

Flake, Sven: "Wat are virtual ECUs?" dSPACE GmbH, pp. 1-9, Aug. 22, 2018, retrieved from the internet May 13, 2022, XP055921087, https://www.dspace.com/en/ltd/home/news/engineers-insights/blog-virtuals-ecus-1808.cfm.

Han, Ching-Chih et al: "Scheduling Parallelizable Jobs on Multi-processors" Proceedings of the Real Time Systems Symposium, Dec. 5-7, 1989, IEEE, Dec. 5, 1989, pp. 59-67, XP010017777, DOI: 10.1109/REAL.1989.63557.

Anonymous—"AUTOSAR—Wikipedia" Dec. 17, 2021, pp. 1-10, https://en.wikipedia.org/w/index.php?title=AUTOSAR&oldid=1060715754.

Chakraborty, Sarthak et al: "Scheduling Algorithms for Scheduling Algorithms for Shared-Memory Multi-Processor Systems" AOSD Reading Assignment, pp. 1-13, Oct. 13, 2020, https://medium.com/aosd-reading-assignment/scheduling-algorithms-for-shared-memory-multi-processor-systems-9c62208ce10c.

* cited by examiner

*Primary Examiner* — Kenneth Tang
(74) *Attorney, Agent, or Firm* — Muncy, Geissler, Olds & Lowe, P.C.

(57) ABSTRACT

A method is provided for configuring an SIL simulation of a control unit running on a computer, software modules for the control unit, which have a plurality of tasks, being installed on the computer for the SIL simulation of the control unit, the tasks being processed in a predetermined clock cycle having a periodic period between the individual clock time points, and the computer including a plurality of processor cores, on which a plurality of virtual machines run, which each process predetermined tasks. A possibility is thus provided for minimizing the computing time of an SIL test.

8 Claims, 4 Drawing Sheets

CONFIGURATION OF AN SIL SIMULATION OF A CONTROL UNIT RUNNING ON A COMPUTER

This nonprovisional application claims priority under 35 U.S.C. § 119(a) to European Patent Application No. 21215811, which was filed in Europe on Dec. 20, 2021, and which is herein incorporated by reference.

BACKGROUND OF THE INVENTION

Field of the Invention

The present invention relates to a method for configuring an SIL simulation of a control unit running on a computer, software models for the control unit, which include a plurality of tasks, being installed on the computer for the SIL simulation of the control unit, the tasks being processed in a predetermined clock cycle having periodically consecutive clock time points, and the computer including a plurality of processor cores, on which a plurality of virtual machines run, which each process predetermined tasks.

Description of the Background Art

A virtual control unit, a so-called V-ECU, is a piece of software which simulates a real control unit or a part of a real control unit in a simulation scenario. Generally speaking, a processor-operated device simulated on a computer with the aid of a software model is referred to in the present case as a VPU (virtual processing unit).

Different V-ECU versions cover a wide range of variants, from very simple versions to a complete version containing all components of a real control unit. The simplest form of a V-ECU has only one component for each function. In a more complex version, the V-ECU contains multiple linked software components, for example the complete functionality of a control unit. In the automotive sector, for example, the AUTOSAR Runtime Environment (RTE) and the operating system are also part thereof for realistic task scheduling. If necessary, selected software components may be added to simulate the bus communication or the NVRAM. A V-ECU becomes even more realistic if the real basic software code is added, which is also used in the series code. This means that a V-ECU contains components of application and basic software and therefore provides functionalities which are comparable to those of real control units. They are used, for example, for validation during a computer-based simulation.

Since one does not work with real control unit hardware when using a V-ECU, the simulation may take place faster than in real time, so that the analysis of the simulated control unit may occur extremely time-efficiently and comfortably.

Software functions, V-ECUs, or complete V-ECU networks may be simulated and tested in computer-based simulations, using software-in-the-loop (SIL) tests. As mentioned above, this may take place in real time or even faster and with higher quality in parallel.

Software development processes for classic automobile applications, such as drive train or brake systems, including e-drive applications and functions for autonomous driving, may be significantly accelerated by virtual testing and validation using SIL tests. A DUT (device under test) may thus be comfortably simulated on a computer, connected to physically based models, and test scripts may be easily reused on hardware-in-the-loop (HIL) systems at a later time.

In SIL tests, the choice of the hardware and the model topology has a significant effect on the execution speed of the simulation with the same result. There are many variable parameters, so that a user must contribute a great deal of knowledge about the simulator, its hardware, and the model topology in order to efficiently process an SIL test on a computer.

SUMMARY OF THE INVENTION

It is therefore an object of the present invention to provide a possibility for minimizing the computing time of an SIL test.

According to an exemplary embodiment of the invention, a method is provided for configuring an SIL simulation of a control unit running on a computer, software modules for the control unit, which have a plurality of tasks, being installed on the computer for the SIL simulation of the control unit, the tasks being processed in a predetermined clock cycle having periodically consecutive clock time points, and the computer including a plurality of processor cores, on which a plurality of virtual machines run, which each process predetermined tasks, including the following method steps: (a) Ascertaining sporadic model components and periodic model components of the software models; (b) Creating a group of parallelizable tasks from the periodic model components of the software models; (c) Determining the individual clock time points of the parallelizable tasks down to the smallest common multiple of all periods between the clock time points of the parallelizable tasks; (d) Ascertaining the calculation duration of the individual tasks at their particular clock time points; and (e) Ascertaining the distribution of the tasks to the individual virtual machines and the distribution of the virtual machines to the individual processor cores on the basis of the determined smallest common multiple of all periods between the clock time points of the parallelizable tasks and the ascertained calculation duration of the individual tasks at their particular clock time points in such a way that the computing time of the SIL simulation is minimal.

Due to the invention, a particularly efficient selection and use of the hardware is achieved. If the degree of parallelism at the recurring time points is low, this may indicate a non-optimally utilized system, or the degree of parallelism during the most frequent events may result in an indication of the necessary processor cores. The longest task to be calculated per clock time point determines the minimum value of the computation length and indicates how long the computation length would be even with a hardware optimization. If it is ascertained in step e) that the existing configuration does not result in a minimal computing time, a reconfiguration is suggested according to the invention.

Moreover, a plurality of processor cores may be provided by a plurality of single-core processors or by a multicore processor or by a plurality of multicore processors. The period between the individual clock time points determines the clock speed.

If, in the present case, software models for the control unit are installed on the computer for the SIL simulation of the control unit, this means that these software models represent a virtual map of the control unit, the software models supplying output signals or output values corresponding to input signals and/or input values, just as they would be supplied by the control unit if corresponding input signals and/or input values were to be applied thereto.

The method can also include the additional step: (f) Reconfiguring the software models according to the distribution ascertained in step (e) of the tasks to the individual virtual machines and the distribution of the virtual machines to the individual processor cores.

The reconfiguration ascertained in step (e) is thus implemented in step (f).

It is also preferred that step (e) of ascertaining the distribution of the tasks to the individual virtual machines and the distribution of the virtual machines to the individual processor cores comprises the following reconfiguration: transferring a portion of the SIL simulation to at least one further computer if the number of tasks exceeds the number of processor cores of the computer used up to now for the SIL simulation.

Because the communication effort by the software models is known, it is possible to precisely calculate where the separation is optimal. In this case, each separation option may be offset against the communication effort and the parallelization gains on a one-time basis.

It can also be provided that step (e) of ascertaining the distribution of the tasks to the individual virtual machines and the distribution of the virtual machines to the individual processor cores comprises the following reconfiguration: changing the period of a particular tasks to a larger period, preferably to the next larger period.

This may be displayed if the calculation of a task does not have any inputs and outputs at the same clock time points. The clock time points at which parallel calculations may be carried out have too small a share of the total computing time, so that the parallel calculation has very little influence on the total calculation time. Better matched periods may, however, have a positive influence on the computing speed.

Different approaches are possible with respect to a reconfiguration. According to an example, it is provided that step (e) of ascertaining the distribution of the tasks to the individual virtual machines and the distribution of the virtual machines to the individual processor cores comprises the following reconfiguration: dividing a computationally more intensive task into at least two computationally less intensive tasks.

This may be displayed if the tasks have a different computational load, so that the gains due to parallelization have very little influence.

Within the scope of a possible reconfiguration, it is preferably also provided that step (e) of ascertaining the distribution of the tasks to the individual virtual machines and the distribution of the virtual machines to the individual processor cores comprises the following reconfiguration: switching to faster processor cores.

Within the scope of the invention, changes are thus also possible, which mean a change of hardware.

Step e) of ascertaining the distribution of the tasks to the individual virtual machines and the distribution of the virtual machines to the individual processor cores can comprise the following reconfiguration: combining at least one portion of the tasks which communicate with each other.

If the bus simulation and port communication are also taken into account, suggestions in the opposite direction may also be made.

It is also provided that step e) of ascertaining the distribution of the tasks to the individual virtual machines and the distribution of the virtual machines to the individual processor cores comprises the following reconfiguration: assigning at least one further processor core to a virtual machine.

The invention further relates to a nonvolatile, computer-readable memory medium, having a computer program stored thereon, which, when executed on a processor, effectuates a method according to one of the preceding claims.

A method is also provided for configuring an SIL simulation of a control unit running on a computer, software modules for the control unit, which have a plurality of tasks, being installed on the computer for the SIL simulation of the control unit, the tasks being processed in a predetermined clock cycle having a predetermined period between the individual clock time points, and the computer including a plurality of processor cores, on which a plurality of virtual machines run, which each process predetermined tasks, including the following method steps: (a) Ascertaining sporadic model components and periodic model components of the software models; (b) Creating a group of parallelizable tasks from the periodic model components of the software models; (c) Determining the individual clock time points of the parallelizable tasks down to the smallest common multiple of all periods between the clock time points of the parallelizable tasks; and (g) Visualizing the tasks which are to be carried out at a particular clock time point.

Within the scope of the invention, however, it is not absolutely necessary for the method to trigger a reconfiguration. Visualizing the tasks to be carried out at a particular clock time point may already be helpful for a user during the configuration.

The method described above can also include the following additional method step: (d) Ascertaining the calculation duration of the individual tasks at their particular clock time points, the particular calculation duration of the individual tasks being visualized in step g) of visualizing the tasks to be carried out at a particular task time point.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
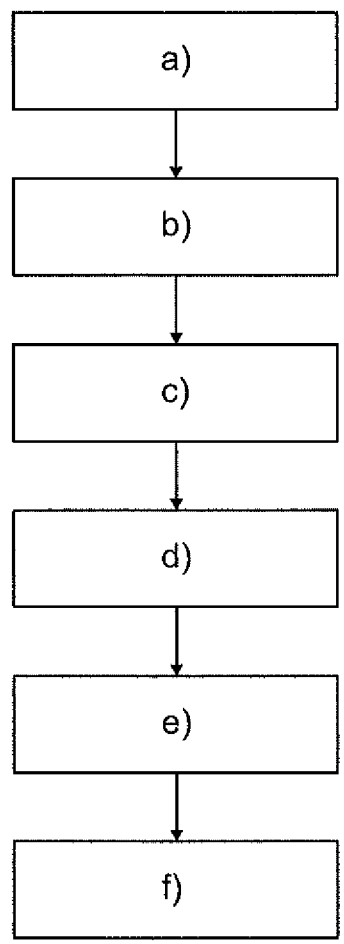
FIG. 1 shows a flowchart of a method according to a first exemplary embodiment of the invention.

A flowchart for a method according to a first exemplary embodiment of the invention is apparent from FIG. 1. It is a method for configuring an SIL simulation of a control unit running on a computer, software models for the control unit, which have a plurality of tasks, being installed on the computer for the SIL simulation of the control unit, the tasks being processed in a predetermined clock cycle having a predetermined period between the individual clock time points, and the computer including a plurality of processor cores, on which a plurality of virtual machines run, which each process predetermined tasks.

In a first method step a), an ascertaining of sporadic model components and periodic models components of the software models takes place. This is followed by step b) of creating a group of parallelizable tasks from the periodic task components of the software models. In step c), the individual clock time points of the parallelizable tasks are determined down to the smallest common multiple of all periods between the clock time points of the parallelizable tasks. In step d), the calculation duration of the individual tasks is ascertained at their particular clock time points.

In step e), the distribution of the tasks to the individual virtual machines and the distribution of the virtual machines to the individual processor cores on the basis of the determined smallest common multiple of all periods between the clock time points of the parallelizable tasks and the ascertained calculation duration of the individual tasks at their particular clock time points may then be ascertained in such a way that the computing time of the SIL simulation is minimal. A reconfiguration is also taken into account, according to which a portion of the SIL simulation is transferred to at least one further computer if the number of tasks exceeds the number of processor cores of the computer used up to now for the SIL simulation. A reconfiguration of this type is also taken into account in step e), which comprises a changing of the period between the individual clock time points to the largest period between identical parallelizable tasks. Possible further reconfigurations comprise dividing a computationally more intensive task into at least two computationally less intensive tasks, switching to faster processor cores, combining at least a portion of tasks which communicate with each other, and assigning at least one further processor core to a virtual machine.

Finally, the actual reconfiguration of the software models takes place in step f) according to the distribution ascertained in step e) of the tasks to the individual virtual machines and the distribution of the virtual machines to the individual processor cores.

Figure 2:
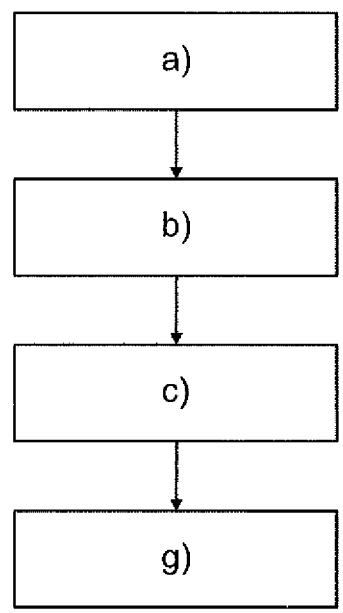
FIG. 2 shows a flowchart of a method according to a second exemplary embodiment of the invention.

Within the scope of the invention, however, it is not absolutely necessary for the method to trigger a reconfiguration. As is apparent from FIG. 2, an alternative method according to a second preferred exemplary embodiment is designed as follows.

This is also a method for configuring an SIL simulation of a control unit running on a computer, software models for the control unit, which has a plurality of tasks, being installed on the computer for the SIL simulation of the control unit, the tasks being processed in a predetermined clock cycle having a predetermined period between the individual clock time points, and the computer including a plurality of processor cores, on which a plurality of virtual machines run. In principle, steps a) through c) are the same as in the first preferred exemplary embodiment of the invention.

In a first method step a), an ascertaining of sporadic model components and periodic models components of the software models takes place. This is followed by step b) of creating a group of parallelizable tasks from the periodic task components of the software models. In step c), the individual clock time points of the parallelizable tasks are determined down to the smallest common multiple of all periods between the clock time points of the parallelizable tasks. However, this is now followed by a step g), in which the tasks to be carried out at a particular clock time point are first only visualized. A visualization of this type may be useful to a user during the configuration being discussed here.

Figure 3:
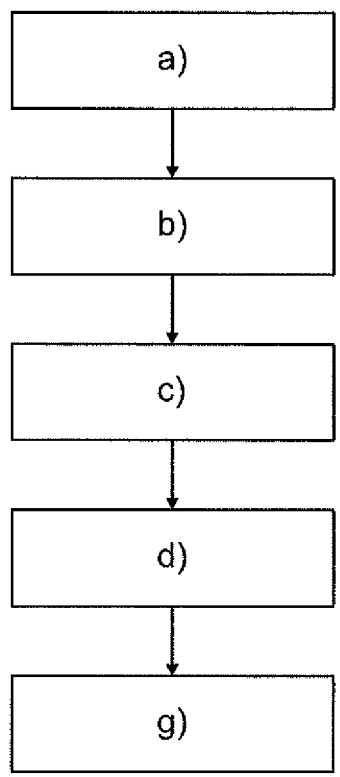
FIG. 3 shows a flowchart of a method According to a third exemplary embodiment of the invention.

The method according to the second exemplary embodiment of the invention described above may be further designed as illustrated in FIG. 3. This third preferred exemplary embodiment of the invention subsequently provides a step d) following step c), in which the calculation durations of the individual tasks at their particular clock time points are ascertained. In this respect, step g) is modified compared to the second preferred exemplary embodiment of the invention in that the visualization of the tasks to be carried out at a particular clock time point additionally contains the particular calculation duration of the individual tasks.

The method described above can be made up of multiple parts, namely, for example, an analysis of the system, an automatic profiling of the system, which means that the program code of a simulation is run through, so that the capacity utilization of the system is recognizable, a visualization of the system and the profile, and the output of improvement suggestions for a higher throughput. An essential aspect may be the determination of the most optimal virtual machine with respect to runtime costs.

During the simulation, the individual models run in parallel to a certain degree. The specific load distribution takes place via the operating system, using parallel processes. The simulation ensures that the result always remains the same, due to a synchronization of the models. The degree of parallelization is limited by the number of available processor cores and by the number of submodels. According to the exemplary embodiments described in the present case, it is thus provided, for example, to analyze the model, measure model partial runtimes in the simulation, visualize them, and then suggest instructions on ways to increase the computing speed.

The load distribution is set up by hand in HIL simulators, while the load distribution takes place implicitly via the operating system in PC-based simulators. Very different parameters exist, which influence the speed of the overall simulation. For a given simulation system, the simulation speed of a simulation is close to optimal with respect to the execution speed, among other things due to the automatic load distribution. An acceleration of the system should therefore be aimed at changing the simulated system or the hardware. The complex parameters which influence the parallelizability are, in principle, known to the simulator and should be analyzed with the aid of the method described in the present case and displayed to the user in a comprehensible way.

In a discrete, event-based simulation, the simulation takes place only at points in time, at which there is something to calculate. Simulation portions without a causal dependency may be calculated simultaneously without corrupting the result. This is generally at the same virtual time point.

When parallelizing processes of this type, it is usually assumed in a simplified manner in the literature that the parallelizable portions are of equal size, and the number of computing units are much smaller than the tasks to be calculated in parallel. In the formula of Ahmdahl's Law (Gene Amdahl: Validity of the Single Processor Approach to Achieving Large-Scale Computing Capabilities. In: AFIPS Conference Proceedings. 30, 1967, pp. 483-485), $$\eta_S = \frac{T}{t_S + \frac{t_p}{np}}$$

where $\pm\eta_S$ is the maximum acceleration due to parallelization, $t_S$ is the sequential program portion, $t_p$ is the parallel program portion, and np is the number of computing units, no parameters exist, for example, to map the individual program runtimes and groups of parallelizable subprograms.

In the present case, therefore, a division between sequential model parts and parallelizable portions are to be determined on a task basis using a static analysis. Periodic tasks from different VPUs should be considered parallelizable, but not sporadic ones. All possible time points down to the smallest common multiple of all periods should be determined from all periodic tasks. Periodic tasks are shown separately. The tasks which must be calculated in each case are determined for these time points. The visualization of these data is helpful for a user and is shown schematically in FIG. 4.

Figure 4:
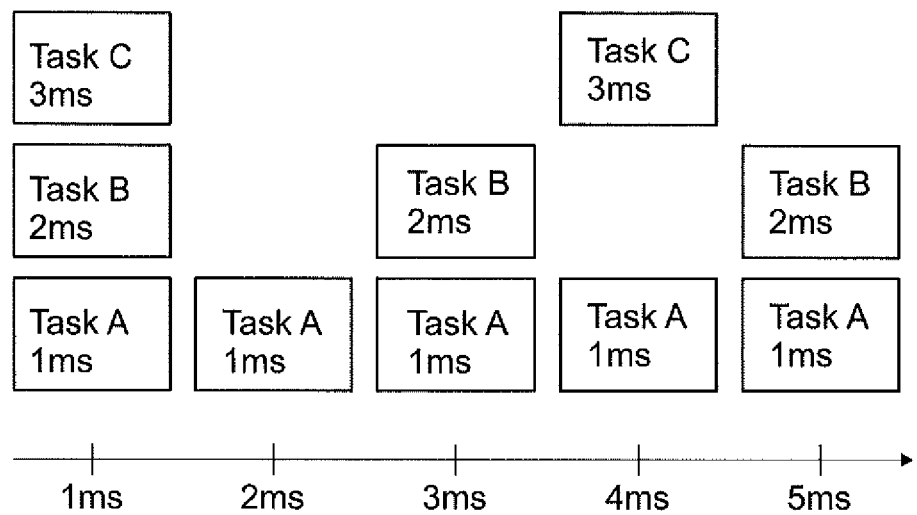
FIG. 4 shows a visualization within the scope of the second exemplary embodiment of the invention.

Tasks A, B, and C, which are carried out at the particular clock time points, are apparent from FIG. 4. The clock time points here are spaced 1 ms apart. Task A takes 1 ms, task B takes 2 ms, and task 3 takes 3 ms. In this specific example, the tasks are relatively well distributed. Outliers, such as an additional task which is calculated every 10 microseconds, would, however, immediately stand out and could be a trigger for a suggestion to periodically calculate the frequently calculated task less often.

Figure 5:
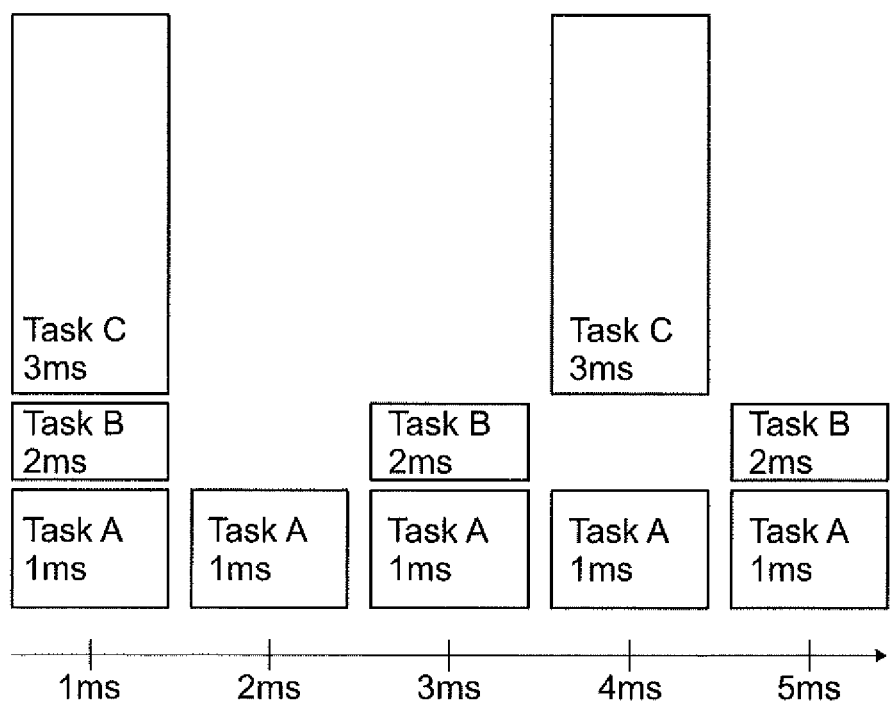
FIG. 5 shows a visualization within the scope of the third exemplary embodiment of the invention.

This visualization may be provided even before the actual simulation. During the simulation, the calculation duration of the tasks per time point may be ascertained and accumulated in that they are observed and measured. The measurement result is not corrupted due to the virtual simulation time. The data are visualized, as shown in FIG. 5. The representation in FIG. 5 essentially corresponds to the representation in FIG. 4, the computational load or real computing time for a particular task is indicated by the height of the box describing the particular task.

In a representation as shown in FIG. 5, the sporadic tasks would also appear and be specially marked to determine the difference between the static system analysis and the real runtime analysis. If a sporadic task is carried out periodically, the user would be notified that it is sensible to convert it into a real periodic task. A suggestion is therefore ascertained, for example as follows:

The simulation may be accelerated by a certain maximum amount as a percentage using a virtual machine having more processor cores.

The simulation may not be accelerated by more processor cores.

The models have a highly varied computational load, so that the gains due to parallelization have very little influence.

It is advantageous to divide the largest model into two smaller ones.

The time points at which parallel calculations are carried out have too small a share of the total computing time, so that the parallel calculation may have very little influence on the total calculation time. Better matched periods may have a positive influence on the computing speed.

The simulation may still be accelerated by faster processor cores.

If the bus simulation and port communication are also visualized, suggestions in the opposite direction may also be made: Tasks which communicate with each other more intensively and of themselves take up very little computing time may also be combined.

A slightly different procedure is used for a cost optimization relating to the virtual machines. A problem is to be solved here, which will be made clear by the following example:

Virtual machines which complete the different simulation runs as quickly as possible are to run on a processor including 6 processor cores. A virtual machine including 4 processor cores would be optimal for a sequential processing. However, if 3 virtual machines, each including 2 processor cores, is used, the particular simulation itself will be slightly slower, but only so much that the fact that 3 virtual machines can run simultaneously more than compensates therefor. If 6 virtual machines including only one processor core were to be used, a great deal of overhead would arise due to the scheduling in the operating system, so that the total calculation would be slower than that with 3 virtual machines. Corresponding considerations apply to the memory use.

The following procedure is used to carry out a cost optimization of this type:

The model is executed for a short moment on each virtual machine of a certain selection. During the simulation, the calculation duration of the tasks per time point is ascertained and accumulated. This continues to take place until the data are sufficient to project the execution time. If the costs are known for each virtual machine, the most economical virtual machine may be determined. It is preferred particularly in cloud applications to integrate the costs for different virtual machines as a target function.

The methods described in the present case may thus visualize the situation and provide instructions for action to be taken. A user uses a simulation system, e.g., including a V-ECU, and a surroundings model. The simulation is used on a computer including 4 processor cores. Because the user would like to achieve a shorter response time for his/her test without influencing the test results, he/she decides to investigate parallelization options. For this purpose, the user uses the method described in the present case and may obtain visualizations as described above and, for example, the following instructions:

"The model contains the following tasks, which may be calculated simultaneously: VPU 1: Task 1 calculates for 0.43 ms and VPU 2: Task 3 calculates for 4.9 ms. 4 processor cores are available to the simulator. Due to a division into two parts, the total simulation may become a maximum of 50% faster, depending on the communication requirements of the VPUs through ports of the VPUs."

The customer now divides VPU 2 into VPU 3 and VPU 4 and again uses the method. This time, the instructions are different:

"The model contains the following tasks, which may be calculated simultaneously: VPU 1: Task 1 calculates for 0.43 ms, VPU 3: Task 3 calculates for 2.9 ms, VPU 4: Task 3 calculates for 2.8 ms. Due to a more balanced division of the computing time of the VPU, no further improvement is possible, because too few processor cores are available for a further division."

For the sake of completeness, a few rules are again listed below as examples, which may be used together with the method described in the present case:

If a large number of conspicuously short calculations and one long calculation exist during a certain period in a V-ECU, the clock period should be adapted.

If the single-core performance of the present computer is below a certain value, switching to more powerful hardware may be suggested and the expected performance increase may also be indicated.

If the number of VPUs is smaller than the number of processor cores, it is possible to indicate that more processor cores will not result in an acceleration.

If the number of VPUs is greater than the number of processor cores, it is possible to indicate the maximum effect that increasing the processor cores would have.

If the calculation of a model does not have any inputs and outputs in the same clock cycle, it is clear that the calculation is being carried out too often. A change in the lowest clock frequency of the connected models may be suggested as the clock frequency.

To determine the maximum speed: The smallest common multiple of the clock frequency may be calculated and the degree of parallelism indicated. The following rules for a predictable number of recurring time points result therefrom:

If one model requires double the amount of time than the other models at a recurring time point, a model division may possibly be worthwhile.

If the degree of parallelism at the recurring time points is low, this may indicate a non-optimally utilized system, or the degree of parallelism during the most frequent events may result in an indication of the necessary processor cores.

The longest model to be calculated per time point determines the minimum value of the computation length and reveals how long the computation length will remain despite a hardware optimization.

If the number of models exceeds the number of cores, a co-simulation may also be carried out on two or even more computers. Because the communication costs due to the model are known, it is possible to precisely calculate where the optimal separation should be: In this case, each separation option may be offset against the communication costs and the parallelization gains on a one-time basis.

If the memory consumption at runtime exceeds a certain value, it should be indicated as a bottleneck.

A processor core may be successively removed from the simulator and the simulation speed calculated using hypervisor technology.

The maximum value for the computing speed is recommended for the individual speed.

The maximum value from the quotient of the computing speed and the number of processor cores is recommended as the optimal capacity utilization in the cloud.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for configuring a software-in-the-loop (SIL) simulation of a control unit running on a computer, the SIL simulation of the control unit, software modules for the control unit, which have a plurality of tasks, being installed on the computer for the SIL simulation of the control unit, the tasks being processed in a predetermined clock cycle having periodically consecutive clock time points, and the computer including a plurality of processor cores, on which a plurality of virtual machines run, which each process predetermined tasks, the method comprising:
 a) ascertaining sporadic model components and periodic model components of the software modules;
 b) creating a group of parallelizable tasks from the periodic model components of the software models;
 c) determining the individual clock time points of the parallelizable tasks down to the smallest common multiple of all periods between the clock time points of the parallelizable tasks;
 d) ascertaining the calculation duration of the individual tasks at their particular clock time points; and
 e) ascertaining the distribution of the tasks to the individual virtual machines and the distribution of the virtual machines to the individual processor cores on the basis of the determined smallest common multiple of all periods between the clock time points of the parallelizable tasks and the ascertained calculation duration of the individual tasks at their particular clock time points in such a way that the computing time of the SIL simulation is minimal,
 wherein step e) comprises transferring a portion of the SIL simulation to at least one further computer if the number of tasks exceeds the number of processor cores of the computer used up to now for the SIL simulation.

2. The method according to claim 1, further comprising:
 f) reconfiguring the software models according to the distribution ascertained in step e) of the tasks to the individual virtual machines and the distribution of the virtual machines to the individual processor cores.

3. The method according to claim 1, wherein step e) of ascertaining the distribution of the tasks to the individual virtual machines and the distribution of the virtual machines to the individual processor cores comprises the following reconfiguration:
 changing the period of a particular tasks to a larger period.

4. A method for configuring a software-in-the-loop (SIL) simulation of a control unit running on a computer, the SIL simulation of the control unit, software modules for the control unit, which have a plurality of tasks, being installed on the computer for the SIL simulation of the control unit, the tasks being processed in a predetermined clock cycle having periodically consecutive clock time points, and the computer including a plurality of processor cores, on which a plurality of virtual machines run, which each process predetermined tasks, the method comprising:
 a) ascertaining sporadic model components and periodic model components of the software modules;
 b) creating a group of parallelizable tasks from the periodic model components of the software models;
 c) determining the individual clock time points of the parallelizable tasks down to the smallest common multiple of all periods between the clock time points of the parallelizable tasks;
 d) ascertaining the calculation duration of the individual tasks at their particular clock time points; and
 e) ascertaining the distribution of the tasks to the individual virtual machines and the distribution of the virtual machines to the individual processor cores on the basis of the determined smallest common multiple of all periods between the clock time points of the parallelizable tasks and the ascertained calculation duration of the individual tasks at their particular clock time points in such a way that the computing time of the SIL simulation is minimal,
 wherein step e) comprises dividing a computationally more intensive task into at least two computationally less intensive tasks.

5. The method according to claim 1, wherein step e) of ascertaining the distribution of the tasks to the individual virtual machines and the distribution of the virtual machines to the individual processor cores comprises the following reconfiguration:

switching to faster processor cores.

6. A method for configuring a software-in-the-loop (SIL) simulation of a control unit running on a computer, the SIL simulation of the control unit, software modules for the control unit, which have a plurality of tasks, being installed on the computer for the SIL simulation of the control unit, the tasks being processed in a predetermined clock cycle having periodically consecutive clock time points, and the computer including a plurality of processor cores, on which a plurality of virtual machines run, which each process predetermined tasks, the method comprising:
- a) ascertaining sporadic model components and periodic model components of the software modules;
- b) creating a group of parallelizable tasks from the periodic model components of the software models;
- c) determining the individual clock time points of the parallelizable tasks down to the smallest common multiple of all periods between the clock time points of the parallelizable tasks;
- d) ascertaining the calculation duration of the individual tasks at their particular clock time points; and
- e) ascertaining the distribution of the tasks to the individual virtual machines and the distribution of the virtual machines to the individual processor cores on the basis of the determined smallest common multiple of all periods between the clock time points of the parallelizable tasks and the ascertained calculation duration of the individual tasks at their particular clock time points in such a way that the computing time of the SIL simulation is minimal, wherein step e) comprises combining at least a portion of the tasks which communicate with each other.

7. The method according to claim 1, wherein step e) of ascertaining the distribution of the tasks to the individual virtual machines and the distribution of the virtual machines to the individual processor cores comprises the following reconfiguration:

assigning at least one further processor core to a virtual machine.

8. A non-transitory, computer-readable memory medium, comprising a computer program stored thereon, which, when executed on a processor, effectuates the method according to claim 1.

* * * * *